United States Patent [19]

Coyne

[11] Patent Number: 5,540,836
[45] Date of Patent: Jul. 30, 1996

[54] WASTEWATER TREATMENT SYSTEM AND METHOD

[76] Inventor: Thomas J. Coyne, 660 S. Thompson, Springdale, Ark. 72764

[21] Appl. No.: 260,702

[22] Filed: Jun. 16, 1994

[51] Int. Cl.$^6$ ..................................................... C02F 1/24
[52] U.S. Cl. ................... 210/221.2; 210/96.1; 210/143; 210/201; 210/205; 210/262; 210/202; 210/294; 210/320; 210/705
[58] Field of Search ................................. 210/96.1, 103, 210/143, 195.3, 199, 202, 205, 206, 221.1, 221.2, 262, 259, 243, 294, 320, 703, 614, 734, 705, 201

[56] References Cited

U.S. PATENT DOCUMENTS

| | | |
|---|---|---|
| 835,120 | 11/1906 | Sulman et al. . |
| 1,943,180 | 12/1934 | Karlstrom . |
| 1,947,429 | 12/1934 | Townsend et al. . |
| 2,322,017 | 6/1943 | Hartman . |
| 2,436,375 | 2/1948 | Booth et al. . |
| 2,983,677 | 5/1961 | Boyd et al. . |
| 3,397,139 | 8/1968 | Sak . |
| 3,444,076 | 5/1969 | Sekikawa et al. . |
| 3,479,281 | 11/1969 | Kikindai . |
| 3,506,570 | 4/1970 | Wukasch . |
| 3,772,187 | 11/1973 | Othmer . |
| 3,772,188 | 11/1973 | Edwards . |
| 3,772,190 | 11/1973 | Eisenmann . |
| 3,926,794 | 12/1975 | Vahldieck . |
| 3,951,795 | 4/1976 | Doncer et al. . |
| 4,031,006 | 6/1977 | Ramirez . |
| 4,085,041 | 4/1978 | Fullerton et al. . |
| 4,173,532 | 11/1979 | Keoteklian . |
| 4,214,987 | 7/1980 | Clemens . |
| 4,219,417 | 8/1980 | Ramirez . |
| 4,250,036 | 2/1981 | Parshall ................................. 210/297 |
| 4,267,050 | 5/1981 | Conway et al. ....................... 210/608 |
| 4,267,052 | 5/1981 | Chang ................................... 210/629 |
| 4,280,886 | 7/1981 | Sawa . |
| 4,282,256 | 8/1981 | Evich . |
| 4,374,027 | 2/1983 | Severeid et al. ...................... 210/608 |
| 4,374,028 | 2/1983 | Medina ................................. 210/669 |
| 4,430,224 | 2/1984 | Fuchs ................................... 210/604 |
| 4,430,225 | 2/1984 | Takamatsu et al. ................... 210/608 |
| 4,490,259 | 12/1984 | Coffing . |
| 4,551,246 | 11/1985 | Coffing . |
| 4,559,146 | 12/1985 | Roets . |
| 4,626,356 | 12/1986 | Suzuki . |
| 4,728,517 | 3/1988 | Markham . |
| 4,790,943 | 12/1988 | Dunn . |
| 4,851,123 | 7/1989 | Mishra et al. ........................ 210/609 |
| 4,988,439 | 1/1991 | Medders, II . |
| 4,988,442 | 1/1991 | Highsmith et al. .................. 210/609 |
| 5,039,428 | 8/1991 | Wentzler et al. ..................... 210/711 |
| 5,047,149 | 9/1991 | Vion . |
| 5,207,923 | 5/1993 | Wese . |
| 5,364,529 | 11/1994 | Morin . |

FOREIGN PATENT DOCUMENTS 2754794   6/1979   Germany .

OTHER PUBLICATIONS

Material Safety Data Sheet, WaterTech, Inc. P.O. Box 11075 Fort Smith, AR 72917, pp. 1, 4, Apr., 1991.

(List continued on next page.)

Primary Examiner—Thomas M. Lithgow
Attorney, Agent, or Firm—Daniel R. Alexander; Head, Johnson & Kachigian

[57] ABSTRACT

A wastewater treatment system and method for substantially reducing or eliminating total suspended solids (TSS), biological organic discharge or biochemical oxygen demand (BOD), and fats, oils and greases (FOG) contaminants. The system includes at least one mixing chamber for mixing wastewater with at least one dewatering agent or chemical and air to form an aerated mixture and at least one tank having a plurality of compartments for facilitating flotation, settling and removal of contaminants from the aerated mixture as it flows through the tank. Preferably, the system includes first and second mixing chambers and first and second tanks arranged in series with each of the tanks including drag lines for removing floating and settled contaminants.

35 Claims, 3 Drawing Sheets

OTHER PUBLICATIONS

Porex S40C$_{TM}$ Porous Plastic Tubes Brochure, Porex Technologies, Fairburn, GA, 1990, Porex Technologies Corp.

Roto–Rooter Drain and Grease Trap Program! Brochure, Copyright 1991 Roto–Rooter Corporation.

Flocculation for better Filtration, Opflow, vol. 18, No. 1 Jan. 1992, pp. 3, 4.

Grainger General Catalog, No. 385, 1994, 333 Knightsbridge Park, Lincolnshire, IL 60069.

Dayton Solenoid Valves, p. 512.

Dayton Repeat Cycle Time Delay Relay, p. 345.

Four Types of Pumps are Appropriate for use with Polymer, Pollution Engineering, Reprinted Jun., 1990, Cahners Pub. Co., Part 1.

The pH and Conductivity Handbook, Omega Technology Company, vol. 28, P.O. Box 4047, Stamford CT 06907, pp. Z–14–Z–20.

Torrington Company Service Catalog, 59 Field Street, Torrington, CT 06790, p. 432.

Bimba Power Cylinder Catalog, Bimba Stainless, Monee, IL 60449 p. 34.

Envirocare Catalog, Hanna Instruments, 584 Park East Drive, Woonsocket, RI 02895, pp. 304, 306, 309, 313, 314.

Edson International Diaphram Pumps Catalogue, 460 Industrial Park Rd. New Bedford, MA 02745, pp. 12, 13.

Abstract, Reid Engineering Company, Inc., 1210 Princess Anne St., Fredericksburg, VA 22404.

Abstract, Norchem Industries, 760 North Frontage Road, Willowbrook, IL 60521.

Flocculants, Sales Handout Sheet, Water Tec, P.O. Box 11075, Fort Smith, AR pp. 14–18.

Abstract, Norchem Industries, 760 North Frontage Road, Willowbrook, IL 60521.

Product Data Sheet, Polytec Inc., P.O. Box 1247, Gulf Shores, AL 36547.

Dynatrol Sensor Information Card, Automation Products, Inc., 1994.

APV Crepaco Membrane Systems brochure, pp. 1–8, Sect. 9, S–1–1.

Safgard Rotary Drum Strainer brochure, The Schuleter Company.

Safgard Roll–Dry Strainer brochure, The Schulter Company.

Safgard Wring–Dry Strainer brochure, The Schlueter Company.

Material Safety Data Sheet, Polytec, Inc., P.O. Box 1247, Gulf Shores AL, 36547, pp. 1–4.

Teel Industrial Series, Diaphragm Pumps, Operating Instructions and Parts Manual, Dayton Electric Mfg., Co. 5959 W. Howard St., Chicago IL 60648, pp. 1–11.

WASTEWATER TREATMENT SYSTEM AND METHOD

BACKGROUND OF THE INVENTION

The present invention is directed to a system and method for removing contaminants from a liquid, and more particularly, concerns a system and method for removing contaminants from wastewater.

Modern federal, state and local water standards, waste disposal guidelines as well as environmental concerns have forced many manufacturing or processing businesses which produce wastewater or process effluents which do not meet the new standards to either shutdown, pay large penalties or surcharges, or implement expensive wastewater treatment equipment. Although it is not particularly difficult to remove relatively large wastewater contaminants such as screenable or large settleable solids, it is extremely difficult to remove suspended solids (total suspended solids TSS), biological organic discharge or biochemical oxygen demand (BOD), fats, oils and greases (FOG), chemicals, metals, salts, certain organic compounds, toxic materials, bacteria, colloidal materials, soluble materials, and chemically bound molecular substances. If a business does not implement a system for treating their contaminated wastewater before disposing of it in the municipal sewer system, they are subject to large monetary surcharges or fines which serve to reimburse local sewage treatment facilities for having to treat the contaminated wastewater.

As an example, a modern meat rendering facility for grinding and processing a variety of meat products for pet food utilizes an abundant supply of water during the meat rendering process and for cleaning the meat products, processing equipment, and plant facilities. The raw wastewater produced by such a rendering facility includes contaminants such as blood, grease, bone, meat, metal, fats, oils, dirt, grit, and the like. Such rendering process wastewater may contain 2,000–8,000 mg/l BOD, 800–4,000 mg/l TSS and over 4,000 mg/l oil and grease. In order to avoid having to pay a tremendous surcharge in order to dump such raw wastewater into a municipal sewer, the wastewater must be treated to significantly reduce the BOD, TSS and oil and grease content.

Water treatment systems for reducing the contaminant levels of raw wastewater to meet modern standards and to be acceptable for either direct disposal in a septic system, recycling through the industrial process or disposal in a municipal sewer system without a penalty or surcharge, is either nonexistent or is so outrageously expensive that most businesses end up paying the surcharges or fines for dumping the raw wastewater into the municipal sewer or paying large fees for storage and disposal thereof. Direct disposal of the raw wastewater costs the company not only the exorbitant surcharges or disposal costs, but also costs the company the benefit of recycling certain valuable components of the wastewater or process effluent.

Conventional static screens ranging from bar screens having large openings of up to two inches to round hole or square mesh screens having very small openings down to 0.01 of an inch may be used to remove large solids and surface debris from wastewater or process effluents. However, static screens tend to clog easily resulting in blinding of the screen and require frequent maintenance. Also, static screens do not reduce the BOD, FOG or TSS contaminants sufficiently to avoid the payment of surcharges.

Externally or internally fed rotary drum strainers provide better wastewater treatment than static filters by improving product recovery, liquid recovery, removal of solid sludges and surface debris sized larger than the openings in the strainer, and reducing sewage requirements and surcharges. However, rotary drum strainers do not eliminate sewage requirements and surcharges by substantially reducing BOD, FOG, and TSS contaminants and also may be prohibitively expensive when faced with wastewater flow rates of over 50,000 gallons per day.

Conventional drain and grease traps including wetting agents for penetrating crusted grease and organic material to break it apart and bacteria to eat and digest the grease, fats, oils and other organic material may be effective at treating low flow rates of relatively clean wastewater, but are impractical and cost prohibitive at treating highly contaminated wastewater at flow rates of over 2,000 gallons per day.

Further, reverse osmosis, nanofiltration, ultrafiltration and microfiltration units including spiral, tubular, ceramic, hollow fiber, and plate and frame membrane configurations may be effective at removing some contaminants from waste effluents or wastewater and at reducing BOD, but may not eliminate sewage surcharges and tend to be very expensive. For example, an estimated budget of $400,000 was considered for a filtration unit which could treat 421,000 gallons per month of poultry processing plant wastewater.

Also, conventional technology in water treatment systems and filtration units may require the use and expense of a combination of different types of treatment units for treating heavily contaminated wastewater. For example, a combination system may include a large sized static screen and a rotating drum filter unit upstream of a reverse osmosis membrane filter so as to reduce clogging and avoid damage to the membrane filter.

Hence, there is a need for an improved wastewater treatment system which can handle heavily contaminated effluents such as meat rendering plant wastewater, which can handle wastewater flow rates of 50,000 or more gallons per day, which is relatively inexpensive to construct and easy to maintain and operate, and which can reduce the BOD, TSS and FOG contaminant levels down to acceptable, permitted levels.

SUMMARY OF THE INVENTION

In accordance with the present invention, the ineffectiveness and prohibitive expense of conventional wastewater treatment systems is addressed by a wastewater treatment system and method which is relatively inexpensive, easy to operate, and which can process high flow rates of highly contaminated raw wastewater and reduce the contaminant levels therein to acceptable TSS, BOD, and FOG levels.

In accordance with one embodiment of the present invention, the wastewater treatment system includes at least one mixing vessel for aerating and mixing raw contaminated wastewater with at least one dewatering agent, and first and second tank units having multiple treatment compartments, at least one air curtain, and skimming and dredging equipment for removing floating and settled contaminants from the wastewater. This system is especially adapted for the treatment of poultry meat rendering plant wastewater or effluents containing high levels of biological organic discharge or biochemical oxygen demand (BOD) such as, blood, meat, bone, feathers or hair, suspended solids (TSS), and fats, oils, and greases (FOG). The contaminants are removed from the wastewater by a combination of settling, flotation, flocculation and biological conversion to produce a treated wastewater product which is essentially free of BOD and TSS contaminants and can be either recycled for reuse in the processing plant, disposed of in a municipal sewer without incurring a substantial surcharge, or disposed of in a septic system.

In accordance with one particular embodiment of the present invention, the treatment system is relatively compact in that it is made up of vertically stacked six foot by three foot by three foot rectangular tank units which together occupy a space of less than four feet wide, eight feet deep, and eight feet high, and which can efficiently treat 4,500 gallons per hour or 100,000 gallons or more per day of raw wastewater and remove a substantial portion of the contaminants from the raw wastewater to produce a treated water output which meets or exceeds federal, state and local wastewater requirements.

A principal objective of the present invention is the provision of a treatment system and method which reduces the biochemical oxygen demand (BOD) and total suspended solids (TSS) of wastewater or process effluents to an acceptable level prior to discharge into a municipal sewer or septic system.

Another object of the present invention is the provision of a wastewater treatment system and method which is environmentally conscious, and uses minimum equipment, energy and chemicals.

A still further object of the present invention is the provision of a wastewater treatment system which is space effective and utilizes a minimum amount of work area.

Yet another object of the present invention is the provision of a treatment system and method which utilizes rapid mix aeration chambers for the injection of chemicals as needed and yet which treat polymers gentle enough to prevent polymer chain breakage.

A still further object of the present invention is the provision of holding, settling, and flotation tank units including counterflow separators which prevent solids from passing through to the following compartment of the tank and which force the floc to a small floc removal area.

Other objects and further scope of the applicability of the present invention will become apparent from the detailed description to follow taken in conjunction with the accompanying drawings wherein like parts are designated by like reference numerals.

DETAILED DESCRIPTION OF THE PREFERRED EMBODIMENTS

In accordance with the present invention, a treatment system and method is provided which is especially suited for removing contaminants from wastewater or process effluents produced by a food processing operation or meat rendering plant. Typically, the wastewater contains high levels of total suspended solids (TSS) and biological oxygen demand (BOD) contaminants, as well as fats, oils and greases (FOG), at levels too high to be injected into the local municipal sewer system. The wastewater treatment system and method of the present invention is adapted to reduce these contaminant levels in the wastewater sufficiently so as to allow the wastewater to be acceptable for drainage into the local municipal sewer system without incurring substantial surcharges and meeting with federal, state and local water standards.

The advent of stricter environmental, waste disposal, water standards, rules and regulations imposed by federal, state and local governments and the penalties incurred by not complying with these standards have subjected the food processing or manufacturing industry to fines, waste disposal surcharges, and expensive waste treatment systems. The wastewater treatment system of the present invention provides an affordable and yet effective solution for treating wastewater or process effluents. Also, the present system is relatively inexpensive, requires a minimum of work space, does not require major restructuring of plant facilities, has minimum maintenance and nominal operation costs, and effectively removes contaminants in order to comply with the new rules and regulations.

Briefly stated, the wastewater treatment system and method of the present invention is designed to receive wastewater from the conventional wastewater drainage system of the processing or manufacturing plant, to remove the high levels of contaminants therefrom, and to return the treated (purified, clarified) water for discharge to the sewer or septic system. The removed contaminant residue made up of floating contaminants, floc, froth, foam, scum and other surface residues and settleable contaminants, solids, bone, meat, metals, grit, sludge and activated sludge can be disposed of in a landfill or may be of necessary composition and quality to be sold or used in the food processing operation or manufacturing process.

Figure 1:
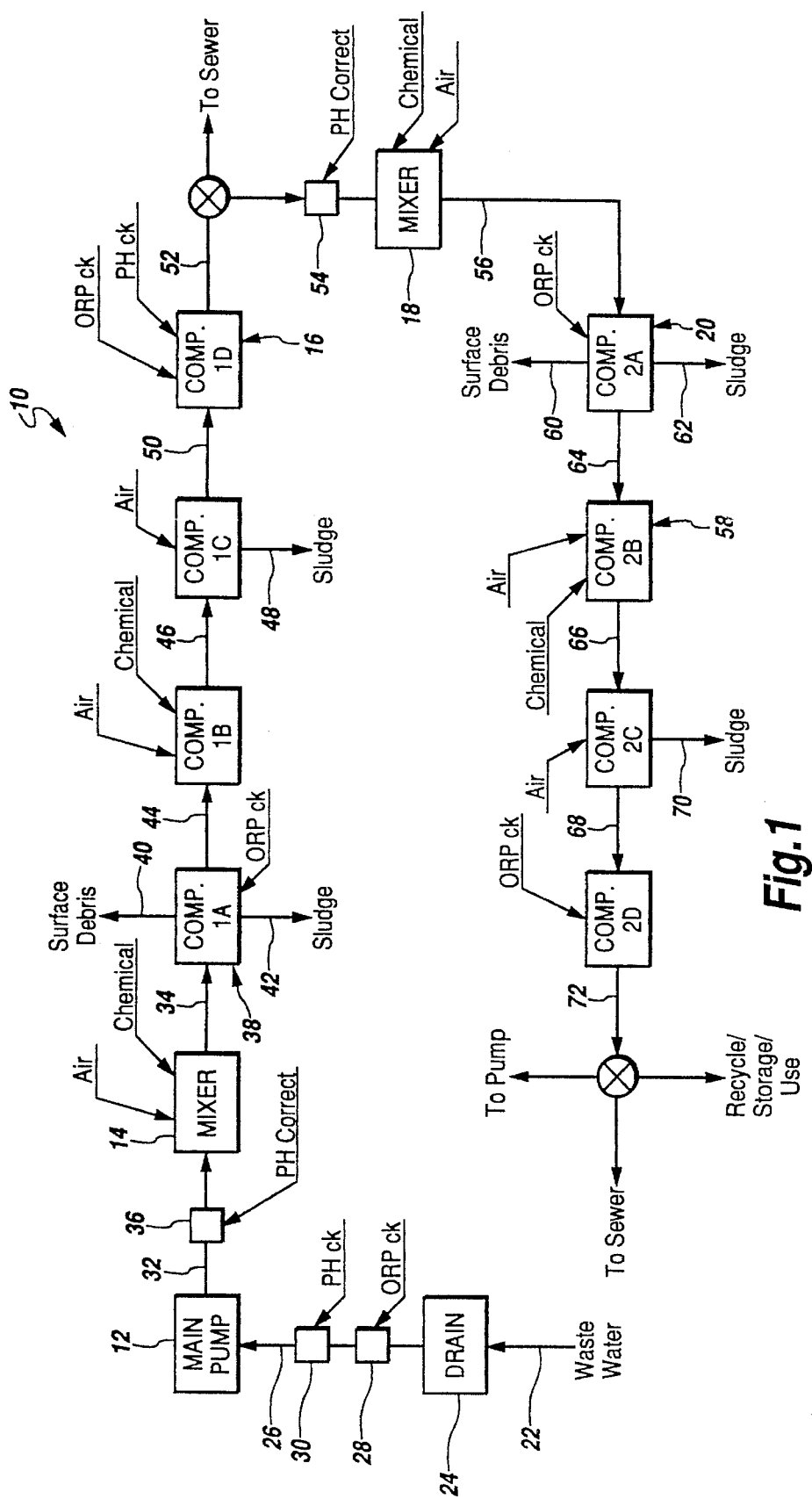
FIG. 1 is a schematic block diagram illustration of the wastewater treatment process and system in accordance with an exemplary embodiment of the present invention.

More particularly, as shown in FIG. 1 of the drawings, a wastewater treatment system and process in accordance with an exemplary embodiment of the present invention is generally designated by the reference numeral 10 and shown to include as major components a main pump 12, a first mixer 14, a first tank unit 16 including compartments 1A through 1D, a second mixer 18, and a second tank unit 20 including compartments 2A through 2D. Raw wastewater 22 containing high levels of contaminants such as floc, froth, foam, scum, sludge, dirt, grime, total suspended solids (TSS), biological organic discharge or biochemical oxygen demand (BOD), fats, oil and grease (FOG), blood, meat, bone, metals, sand, particle chips, bacteria, microorganisms, and the like traveling in drain or pipe 24 is drawn through a conduit 26 by pump 12.

The raw wastewater stream in conduit 26, for example, a three inch diameter PVC pipe, is checked for oxidation reduction potential (ORP) at 28 and pH at 30. The ORP measurement provides information regarding the water pollution or contamination of the raw wastewater which will aid in determining the amount of chemical to be added to the wastewater in mixers 14 and 18. The more polluted or contaminated the wastewater, the more chemical that needs to be added to provide the desired dewatering of the contaminants to facilitate settling, flotation, flocculation, and biological conversion or removal of the contaminants. The pH of the raw wastewater is checked to see if it is above or below a selected pH range which provides for optimum contaminant removal in the tank units 16 and 20. Other characteristics of the raw wastewater in conduit 26 may be checked or tested. For example, the conductivity, percent solids, concentration, specific gravity, density, turbidity, optical clarity and color may also be checked. These measurements (like ORP) provide information regarding water pollution or contamination and may be used to determine the proper amount of chemical to be added in mixers 14 and 18. Also, the temperature of the raw wastewater may be checked to see if it is within a desired temperature range.

The temperature of the raw wastewater may be adjusted by heating or cooling means if the temperature of the raw wastewater stream in conduit 26 falls above or below an optimum treatment temperature range, for example, 50°–80° F. Also, the wastewater 22 in drain 24 can be diluted by adding fresh water or treated wastewater from tank units 16 or 18.

Although the raw wastewater 22 is shown entering the system 10 from drain 24, such as an existing wastewater sewer drain in a processing or manufacturing plant, it is to be understood that the raw wastewater may be received from other sources such as a surge tank, storage tank, or process output. If the wastewater or process effluent 22 of the plant or facility exceeds the capacity of the treatment system 10, the excess wastewater is either allowed to flow into the sewer where it is subject to a sewage surcharge or diverted to a wastewater storage or surge tank for later treatment by the system 10 prior to disposal in the sewer or septic system.

Preliminary biological removal, adsorption, absorption or conversion of raw wastewater contaminants can begin in the drain 24 or storage tank by adding or having bacteria resident in the drain or tank. Bacteria can convert some of the contaminants in the raw wastewater into more easily removed matter such as into biomass, bacteria or floc having a density greater than that of water. For example, contaminants or pollutants such as soluble materials, soluble BOD, ammonia, solids too small to be settled, and chemically bound molecular substances may be biologically converted to biomass by bacteria. Although it is not required for effective operation of the present system, preliminary biological activity on the wastewater will enhance the biological conversion and/or removal of contaminants in the tank units 16 and 20.

Main pump 12 is preferably a diaphragm or piston type pump so as to cause the least disturbance on the raw wastewater while still providing the necessary suction and discharge pressure to draw the wastewater from the drain 24 and supply it under pressure through a conduit 32 to mixer 14 and from mixer 14 through a conduit 34 to tank unit 16. In accordance with one example, pump 12 is a variable speed pneumatic motor driven diaphragm pump such as a TEEL diaphragm pump model 3P681A manufactured for Dayton Manufacturing Company, Chicago, Ill., and having three inch diameter NPT suction inlet and discharge outlet, basic aluminum construction, and which can provide up to about 4,500 gallons per hour when driven at 60 strokes per minute. Centrifugal or rotary pumps including sharp edged vanes, blades or propellers are not preferred since disruption, chopping, and breaking up of the large solids and other contaminants in the wastewater can increase the contaminant levels in the wastewater, increase the chemical requirements necessary to provide for the desired clarification of the wastewater and possibly reduce the gallons per hour of raw wastewater which can be treated effectively. It should be appreciated that if wastewater 22 is under sufficient pressure in drain 24 main pump 12 may not be necessary and may be eliminated.

The pH of the wastewater in conduit 32 is adjusted if necessary at 36 by adding a compound or chemical which will raise or lower the pH so that it is within a desired pH range, for example, 4 to 8. Conventional pH adjusting compounds or chemicals may be added at 36 or to mixer 14 so as to adjust the pH of the wastewater. Depending on the bacteria present in tank units 16 and 20, the pH, temperature and aeration of the wastewater can be adjusted so as to optimize the biological activity in the tanks and thereby optimize the biological conversion and removal of certain contaminants from the wastewater.

Mixing vessel 14 provides for the simultaneous aeration and agitation of the wastewater therein to provide a thorough and rapid mixing of the selected dewatering agents or chemicals with the wastewater. In the treatment of poultry processing plant wastewater, it is preferred to use a high molecular weight polyacrylamide copolymer (cationic polymer) to aid in liquid-solid separation such as clarification, coagulation, sedimentation, filtration, dissolved air flotation and dewatering. A preferred cationic polymer is a medium cationic functioning Polytech cationic polymer type 98 having a typical viscosity of 700–800 cps and marketed by Polytech, Inc., Gulf Shores, Ala. This cationic polymer is supplied in a dry granular form and is mixed with water to form an aqueous polymer stock solution which is added to the wastewater in mixer 14. The Polytech cationic polymer is environmentally safe, non-toxic and can be disposed of along with the treated wastewater in the sewer, septic system, or reused in the processing equipment.

In accordance with one example, an aqueous polymer solution is formed by mixing about 2.08 pounds of dry granular polymer with about 50 gallons of fresh water by very slowly adding the dry polymer to the vortex of the water in a mixing vessel and then providing for hydration by mechanically agitating the polymer/water solution at less than 480 rpm to avoid damage to the polymer chains. Further, dissolution of the polymer (dispersion and hydration) to uncoil and fully hydrate the polymer and develop its maximum viscosity and most efficient state for use in the treatment system 10 involves the agitation in mixers 14 and 18 and holding time and further agitation within tank units 16 and 20.

It is preferred to use a minimum of dewatering agents or chemicals in order to reduce the cost of overall processing and limit the environmental hazards involved. For a given wastewater or process effluent stream, it may not be necessary to add a dewatering agent or chemical to the wastewater to achieve the desired removal of contaminants in the tank units 16 and 20. In accordance with a particular embodiment of treating poultry meat processing wastewater, it is preferred to use about one to fifty gallons of 0.5% aqueous chemical solution (about 2 pounds of granular cationic polymer in 50 gallons of water) for each 8,000 gallons of wastewater. Hence, it follows that it is preferred to use between 0 to 2 pounds of dry granular cationic polymer per 8,000 gallons of raw wastewater.

The aqueous chemical solution and pressurized air are supplied to the mixing vessel 14 via respective inlets and check valves which allow only for the flow of aqueous chemical solution and pressurized air into mixer 14. The flow of aqueous chemical solution into mixer 14 is controlled, for example, by controlling the drive to an air driven pump which is regulated alone with main pump 12 so as to provide for the addition of the minimum amount of dewatering agent or chemical required to provide the desired contaminant removal in tank units 16 and 20. The pneumatic motor or air driven pump for the aqueous chemical solution is considerably smaller than that necessary as main pump 12. One such air driven pump which may be used to supply the aqueous chemical solution to the mixers 14 and 18 is a Sand Piper ball valve PB1/2-A type 3 air powered double diaphragm plastic pump having a 0 to 14 gallon per minute capacity marketed by Warren Rupp of Mansfield, Ohio and which is controlled by a variable speed pump controller (air valve) having a 4 to 20 milliamp input also marketed by Warren Rupp of Mansfield, Ohio. Pressurized air is supplied to mixer 14 at a pressure of about 80 to 120 psi, preferably 100 psi, to provide for the desired aeration and agitation of the wastewater.

The same source of pressurized air, for example, a 10 hp air compressor, can be used to drive all of the air driven pumps, motors, cylinders and mixers at about 80 to 120 psi and the air curtains at about 1 to 2 psi or alternatively a source of pressurized air can be used to drive the pumps and motors with the exhaust (residual air) from the pumps and motors being used as or as a supplement to the pressurized air source for the mixers 14 and 18. Thus, the exhaust air from the main pump 12 and other air driven pumps, cylinders and motors in the system 10 is used in the system and not wasted.

Dewatering agents or chemicals which may be used in mixers 14 and 18 include but are not limited to synthetic water soluble polymers, cationic acrylamide copolymer salts, surfactants, flocculating agents, soaps, detergents, chemicals or compounds for converting certain contaminants into screenable or settleable solids or for converting toxic substances into a nontoxic or less toxic form, and nutrient media for microorganisms for enhancing biological activity in the tank units 16 and 20. Mixer 14 is designed to handle up to about 75 gallons per minute of wastewater.

Tank unit 16 includes a tank 38 having baffles or partitions which together with the walls and top and bottom surfaces of the tank form compartments or sections 1A, 1B, 1C and 1D within the tank and serve to control and direct the flow of wastewater through the tank and also direct settleable solids and other settleable contaminants to a particular region for sludge collection and removal and direct air bubbles, floating debris or surface debris such as floc, foam, froth, scum, grease, oil, fats, and other floating contaminants to a particular region for collection and removal. In accordance with a particular embodiment of the present invention, the tank unit 16 includes a fiberglass tank 38 which holds over 300 gallons of wastewater, is of substantially rectangular outer configuration, which has outer dimensions of about six feet end to end, three feet front to back, and three feet top to bottom, and which includes a triangular opening about two feet wide and two feet high in the bottom of the tank which accommodates mixer 14 so that the mixer 14 and tank unit 16 takes up a minimum amount of space while still providing for the treatment of up to 100,000 or more gallons per day or 75 or more gallons per minute of wastewater. In this particular example, conduits 26, 32 and 34 are three inch diameter plastic or PVC pipe.

It is believed that having a positively charged or cationic tank, using a cationic polymer dewatering agent and charging the wastewater with positively charged air bubbles all contribute to the efficient and highly effective removal of contaminants including BOD and TSS from the wastewater. Thus, it is preferred that the tank be constructed of molded fiberglass, resin or plastic, or plastic coated metal to avoid any negative charges and thereby enhance contaminant removal. Likewise, it is preferred that all of the components which come in contact with the wastewater be either formed of plastic resin or fiberglass or be plastic coated so as to present the wastewater with a cationic or neutrally charged surface.

Wastewater exits conduit 34 and flows into compartment 1A of tank 38. It is preferable to disperse or spread the wastewater as it exits conduit 34 and enters compartment 1A. In accordance with one example, the tank 38 includes a spillway which runs alone the length of the tank so as to spread out the flow from the conduit 34 into a long, thin cascade or waterfall of wastewater which pours into compartment 1A of tank unit 16. In the compartment 1A, the upper, exposed surface of the wastewater is confined to a limited area so that all of the surface debris, floc, scum, froth, foam, floating fats, grease and oils, air bubbles and other floating debris are directed to and collect in the limited area which serves as a skimming trough to facilitate skimming of the surface debris from the wastewater. The wastewater which flows from conduit 34 into the compartment 1A or into a spillway and then into compartment 1A, passes through the layer of surface debris, and is in part filtered by the surface debris. The velocity of the wastewater is slowed as it passes from conduit 34 into compartment 1A since the area of compartment 1A is many times as great as the area of the conduit 34 or spillway. For example, conduit 34 is a three inch diameter PVC pipe, the spillway is approximately six feet lone by about four inches wide, the skimming trough is about six inches wide and six feet long and compartment 1A is six feet long, ranges in width from about four to about ten inches, and has a height of about two feet, eight inches.

Compartment 1A not only provides for the removal of surface debris 40 including froth, foam and scum, but also provides for the removal of sludge 42, activated sludge, and any contaminants which settle to the bottom of the compartment. Although the general flow of wastewater through compartment 1A is a downward substantially vertical flow, air bubbles in the wastewater tend to rise to the surface and facilitate the flocculation and flotation of certain contaminants in the wastewater up to the surface of the wastewater in the skimming trough. The surface debris 40 is removed intermittently or continuously from the skimming trough. For example, the surface debris 40 flows over a spillway at one end of the skimming trough or is pushed or scraped out of the skimming trough by a drag line. Sludge 42 including settled contaminants biomass, floc, sediment, solids, grit, dirt, bone, meat and the like which settle to the bottom of compartment 1A is removed either continuously or intermittently, for example, in a timed fashion related to the operation of main pump 12. Although it is preferred to use a dredge or other sludge removing device which can operate on a continuous basis so as to remove the accumulated sludge 42, in the base of compartment 1A and which tends to accumulate rapidly during treatment of heavily contaminated wastewater or process effluent, tank 38 may include a sludge removal drain or port to accommodate the removal of sludge 42.

In order to optimize the value of surface debris 40 and sludge 42 removed from tank 38 and recovery of water, it is desirable to limit the moisture content of the surface debris 40 and sludge 42 by driving the removal means (drag lines) very slowly or in an intermittent fashion and at least up a slight incline to allow for the moisture to drain from the surface debris and sludge and run back into the tank before the surface debris 40 and sludge 42 are dumped into a collection bin or holding tank.

The surface debris 40 and sludge 42 may be disposed of in a landfill, sold or recycled back into the processing operation depending on the nature and quality of the debris and sludge. Also, some of the sludge 42 (activated sludge) may be returned to or placed in drain 24 so as to start the biological activity ahead of main pump 12 and to insure that a continuous supply of bacteria are added to the wastewater.

Wastewater flows through an opening 44 between compartments 1A and 1B and thereby enters compartment 1B and travels in a generally upward direction at an angle of about 25° to 65°, preferably about 45° with respect to the base of the tank on its way through compartment 1B to compartment 1C. The horizontal cross-sectional area of compartment 1B increases as the wastewater flows upwardly so as to reduce the velocity of the wastewater as it travels through the compartment. Compartment 1B includes a sloped base which directs any contaminants or sediment which settle out of the wastewater to the bottom of compartment 1A so that it may be removed from the tank 38. Compartment 1B is the largest compartment with respect to volume and thereby has the greatest hold time for the wastewater which allows for further settling, flotation, flocculation, and biological conversion or removal of contaminants. Wastewater hold time and contaminant removal is further enhanced by a clockwise rotation or turbulence of the wastewater caused by a voluminous flow of small air bubbles along an inclined upper surface of compartment 1B.

The voluminous flow of air bubbles are created by an air curtain near the base of compartment 1C with the air bubbles flowing upwardly through the compartment 1C, through a small opening 46 between the compartments 1C and 1B, up along the inclined upper surface in compartment 1B and eventually out through the skimming trough in the top of compartment 1A. The upper surface or roof of compartment 1B is inclined upwardly from compartment 1C to compartment 1A at an angle of about 2° to 45°, preferably 6°. The flow of air bubbles across the top of compartment 1B not only causes a swirling or rotational turbulence of the wastewater within compartment 1B, but also serves as a filter at the opening 46 between compartments 1B and 1C in that this voluminous outpouring of small bubbles tends to force solids, sediment, debris, biomass, floc, and other contaminants back into compartment 1B where they either float to the upper surface of compartment 1B and end up in the skimming trough in compartment 1A or settle to the bottom of the compartment 1B and are directed to the bottom of compartment 1A where they are removed from the tank. In this manner, most of the larger settleable solids and other contaminants are confined to compartments 1A and 1B and the wastewater which exits compartment 1B and enters compartment 1C through the voluminous bubbles tends to be relatively clean.

The ORP (conductivity, optical clarity, pH, turbidity, etc.) of the wastewater in compartment 1A (and/or 1B) is checked and if it is not within the desired range, additional chemicals and aeration are added in compartments 1B and/or 1C. At the base of compartment 1C there is a sludge or sediment drain for removing any sludge 48 (contaminants, biomass, etc.) which has settled out of the wastewater in compartment 1C.

The air curtain or curtains of minute air bubbles (for example, 20 to 400 microns) emanates from or near the base of compartment 1C and travels substantially vertically up through compartment 1C where it transforms from a well organized emanation of minute bubbles which travel upwardly through the wastewater flowing down through the compartment 1C into a disorganized voluminous mass of larger bubbles which crowd the small opening 46 at the upper end of compartment 1C. One means for generating such an air curtain is a length or loop of porous plastic tubing on or near the base of compartment 1C and which receives air at about 1 to 2 psi. One example of such a porous plastic tube is POREX S40C plastic tubes by POREX Technologies Fairburn, Ga. It is preferable to use polypropylene tubing to achieve a maximum positive charge on the air bubbles. Other plastics such as polyethylene may be used.

In accordance with one example of the invention, at least one side wall of compartment 1C extends upwardly at an angle, of about 2° to 20°, preferably 7°, with respect to vertical, so that compartment 1C narrows towards its upper end. For example, compartment 1C is approximately six inches or more wide at its base and only two or three inches wide at the top of the compartment. Thus, the air bubbles from the air curtain or curtains are forced into a smaller area and as such become more crowded and convert into the voluminous mass of bubbles which are forced through the small opening 46 between compartments 1B and 1C. In accordance with a particular example, the opening 46 is a rectangular, vertically oriented opening about six feet long and about two inches high. The velocity of the wastewater increases as it flows from compartment 1B into compartment 1C and then decreases as it flows from the top to the bottom of compartment 1C.

The upwardly traveling bubbles in compartment 1C facilitate the flotation, flocculation and removal of suspended solids and other contaminants from the wastewater which is traveling in a generally downward direction. The contaminants removed by the bubbles are carried to compartment 1B and either settle to the bottom of compartment 1A or are carried along the top of compartment 1B to the skimming trough in the top of compartment 1A. The wastewater travels from compartment 1C through opening 50 to compartment 1D another generally vertically oriented compartment. In accordance with a particular example, compartment 1D is opposite that of compartment 1C in that compartment 1D is narrow at its base and wide at its top so that the velocity of the wastewater is reduced as it travels from the bottom to the top of compartment 1D. The wastewater in compartment 1D is highly clarified and/or purified with respect to the wastewater that entered compartment 1A. The top of compartment 1D is open to allow for the escape of gases and air from the wastewater in compartment 1D.

The treated wastewater exits compartment 1D through a spillway or one or more openings and travels through a conduit 52 to mixer 18. Treated wastewater exits compartment 1D at the same height as that of the skimming trough in the top of compartment 1A so that the wastewater in the tank 38 is maintained at the proper level so as to allow for removal of surface debris from the surface of the wastewater in the skimming trough. Any surface debris which collects on the surface of the treated wastewater in compartment 1D is drawn through the spillway or opening with the exiting wastewater.

Although the tops of compartment 1A, 1B and 1C may be open, it is preferred that they are covered by a surface which slopes upwardly at an acute angle toward compartment 1A so as to provide for the flow of air bubbles and contaminants alone the top of compartments 1C and 1B and out through the skimming trough in the top of compartment 1A. Also, it is preferred that compartments 1A and 1B are separated by a downwardly extending partition which extends at an angle of about 2° to 20°, preferably 14° with respect to vertical, to direct settling contaminants to a sludge removal area. Also it is preferred that the partition separating compartments 1A and 1B includes a limited upper opening near one end of the tank to limit the disruption to the debris floating on the surface of the wastewater in the skimming trough caused by air bubbles from compartments 1B and 1C.

The gases emanating from the wastewater surface in compartments 1A and 1D are collected and vented. These gases may contain air, methane, noxious odors which for safety and comfort reasons are collected and vented directly or processed and then vented to the exterior of the processing plant or facility.

The semi-purified or clarified wastewater exits tank unit 16 via conduit 52 and is routed on to the second mixer 18 and tank unit 20 if it needs further processing to reduce or eliminate contaminants. The ORP (conductivity, pH, turbidity, optical clarity and the like) of the wastewater in compartment 1D is checked to see if the wastewater needs further treatment, that is further contaminant removal so as to meet the desired water purity standards. If however, the wastewater exiting compartment 1D meets the desired standards, it may be routed to the sewer, the septic system or stored and/or recycled for use in the processing plant. Relatively clean wastewater may only require treatment in the first tank unit 16 in order to achieve the desired clarity and purity so as to meet the federal, state and local rules, guidelines and standards and avoid the necessity of paying excessive sewage surcharges. When processing highly contaminated wastewater or waste effluents, it is necessary to route the wastewater from the first tank unit 16 on to the second mixer 18 and tank unit 20 so as to provide for further addition of dewatering agents or chemicals, aeration, and removal of contaminants such as TSS, BOD and FOG.

The second mixer 18 and second treatment tank unit 20 are preferably of the same construction and operate in the same fashion as the first mixer 14 and first tank unit 16 to provide For additional removal of contaminants from the treated wastewater which exits the first tank unit 16. Briefly, the pH of the wastewater is checked in compartment 1D or conduit 52 and if necessary the pH of the wastewater traveling on to the second mixer is adjusted at 54 or in the mixer 18. In the mixer 18 the wastewater is agitated, aerated and mixed with one or more dewatering agents or chemicals. Depending on the ORP, conductivity, optical clarity, pH, and/or turbidity of the wastewater in compartment 1D or exiting tank unit 16, additional agents or chemicals may not be necessary. Also, the temperature and nutrients (oxygen level) in the wastewater can be adjusted to provide for maximum biological activity in tank unit 20. Wastewater exits mixer 18 and flows through conduit 56 to tank unit 20.

Tank unit 20 is preferably the same as tank unit 16 and includes a treatment tank 58 having compartments 2A, 2B, 2C and 2D and including means, for example, skimming means and sludge dredging means for removing surface debris 60 and sludge or activated sludge 62 from compartment 2A. The compartments 2A–2D are preferably the same as compartments 1A–1D and have respective openings 64, 66, and 68 joining the compartments. The ORP, conductivity, pH, turbidity, optical clarity, etc. of the wastewater in compartment 2A is checked and additional chemical and air is added to compartment 2B and 2C if necessary. Compartment 2C includes an air curtain and a drain or port for removing sludge 70 therefrom. The contaminant levels, ORP, conductivity, pH, turbidity, optical clarity, etc. of the wastewater in compartment 2D are checked and if it meets with the desired water quality standards, the wastewater exits compartment 2D through a spillway or one or more openings to a conduit 72 and is directed to either the municipal sewer, a septic system, storage or recycled for use in the process. If the wastewater exiting compartment 2D is not of the desired clarity or purity (for example, contains excessive BOD and TSS levels), it is returned to main pump 12 and sent through the system again for further treatment.

It is believed that the treatment system 10 of the present invention provides for an unexpected and surprising reduction in the contaminants in the wastewater based in part on avoiding or minimizing mechanical agitation of the wastewater so as to avoid the fragmentation, disintegration or chopping up of contaminants, and also in that a large number of the contaminants such as suspended solids and debris are believed to be negatively charged so that the use of positively charged or cationic chemicals, air bubbles, and surfaces in the treatment system 10 facilitates the removal of contaminants by sedimentation, flotation, flocculation, dewatering, and the like. The air bubbles are positively charged by forcing the air through polypropylene or ionizing the air for the mixers and air curtains.

Also, it is believed that the system 10 utilizes changes in velocity, aeration, pressure and turbulence to facilitate the removal of contaminants. For example, the velocity of the wastewater changes as it flows from conduit 32 into mixer 14, from mixer 14 into conduit 34, from conduit 34 into compartment 1A of tank unit 16, and through the different compartments within the tank unit 16. Similarly, changes in pressure tend to enhance flotation or settling of contaminants. Moreover, increases in pressure tend to increase the biological activity, conversion, and removal of contaminants by, for example, increasing the transfer of nutrients across the cell walls of the bacteria.

In accordance with a particular embodiment of the present invention, the first and second tank units 16 and 20 are vertically stacked with the first tank unit being located above the second tank unit. This vertically stacked arrangement allows the forces of gravity to cause the wastewater which exits the first tank 38 to flow through the conduit 52 through mixer 18 and into tank 58 and allows the surface debris and sludge removed from the first and second tanks to fall into a common collection bin. This vertically stacked embodiment also provides for a minimal use of floor space.

If one of the tanks is not located above the other, then it may be necessary to add a second pump between the first tank unit 16 and the second mixer 18. Preferably, the second pump is substantially the same as the main pump 12, for example, an air driven diaphragm pump having three inch diameter inputs and outputs.

Although it is preferred to have identical first and second tank units, it is not necessary to do so. For example, the second tank unit 20 may be smaller than the first tank unit 16 since a majority of the contaminants may have been removed from the wastewater as it is treated in the first tank unit.

Although it is preferred that the first and second mixers 14 and 18 are separate items or components from the tank units 16 and 20, it is to be understood that the mixers may be molded into or formed as an integral part of the first and second tank units with a conduit or opening providing for flow of wastewater from the mixer into the first compartment of the tank unit.

Even though it is preferred to have biological activity within the tank units for biologically converting or removing some of the contaminants in the wastewater, it is contemplated that for certain wastewaters or certain effluents this is not necessary or possible and, hence, bacteria need not be present in the tank units.

Since processing plant or manufacturing facilities do not always produce a steady stream of wastewater or waste effluent, the wastewater treatment system and method of the present invention is adapted to treat either a steady flow or a sequential or sporadic flow of wastewater to the system. In accordance with a particular example of the present invention, the treatment, purification and clarification efficiency of the present system in processing poultry processing plant wastewater is optimum at flow rates of up to 75 gallons per minute of wastewater through the system having vertically stacked, identical first and second tank units with dimensions of at least six feet by three feet by three feet. Such a system is capable of treating over 100,000 gallons of wastewater per day and effectively reducing the TSS and BOD contaminants to a level necessary to avoid excessive sewage surcharges. For example, such a system can remove 2,000 pounds of sludge and surface debris from 10,000 gallons of raw wastewater.

Figure 2:
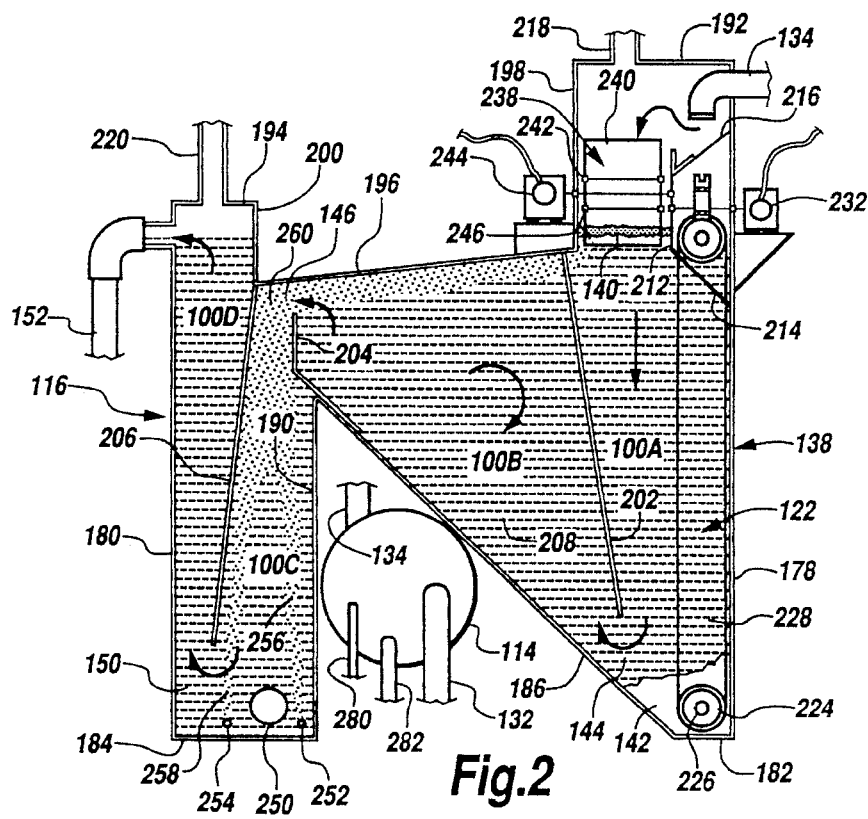
FIG. 2 is a partial cross-section end elevational view illustrating the upper tank unit of one particular embodiment of the present treatment system.
Figure 3:
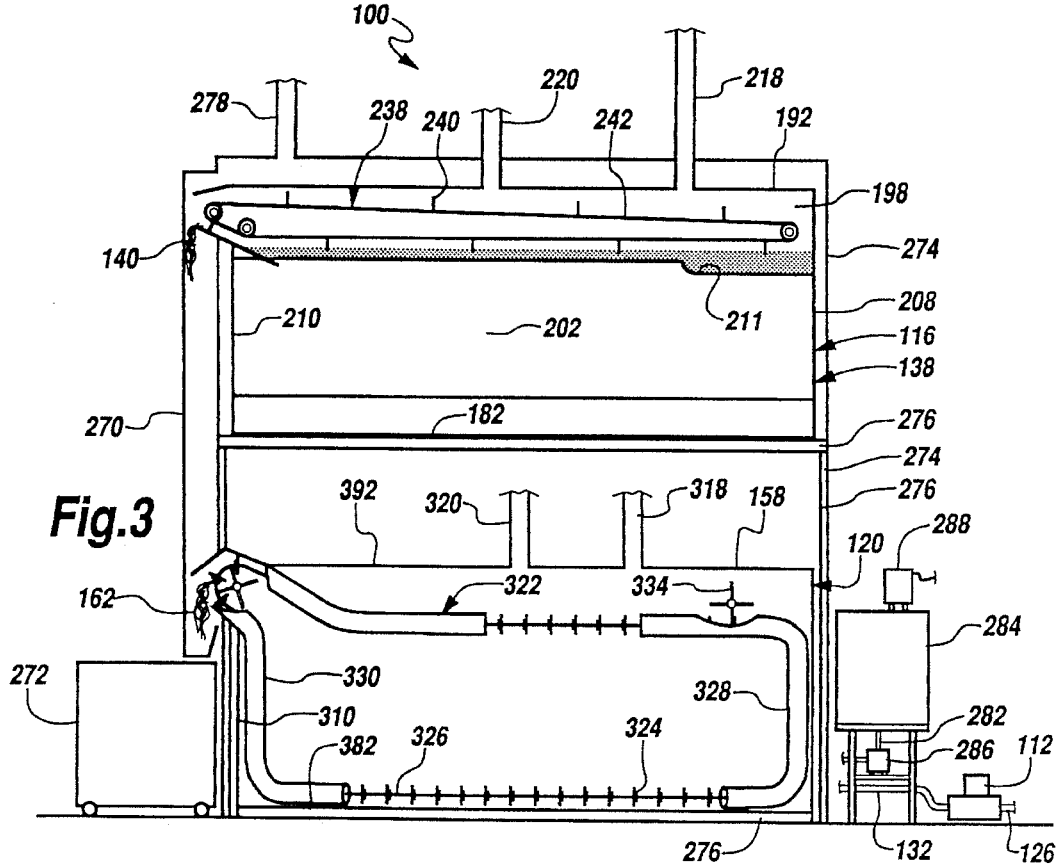
FIG. 3 is a partial cross-sectional side elevational view representing the upper and lower tank units of the particular embodiment of the system of FIG. 2.

As shown in FIGS. 2 and 3 of the drawings and in accordance with a particular embodiment of the present invention, the system is generally designated 100 and shown to include first and second tank units 116 and 120. First treatment tank unit 116 includes a fiberglass tank 138 having compartments 100A, 100B, 100C, and 100D with compartments 100A and 100B joined by an opening 144, compartments 100B and 100C joined by an opening 146, and compartments 100C and 100D joined by an opening 150. The tank 138 ham a substantially rectangular outer configuration. For example, tank 138 has outer dimensions of about six feet long, three feet high and three feet wide.

The tank 138 has substantially vertical front and back walls 178 and 180, horizontal bottom sections 182 and 184, and an angled bottom section 186 joined to horizontal base section 184 by a vertical wall 190. The tank 138 also includes horizontal top sections 192 and 194 joined to an upwardly angled top section 196 by vertical walls 198 and 200. A mixer 114 (mixing chamber or vessel) is shown located in the triangular opening created by walls 186 and 190.

Compartments 100A and 100B of tank 138 are separated by an angled baffle or partition 202. Compartments 100B and 100C are in part separated by bottom wall 186 and an upstanding partition 204. Compartments 100C and 100D are separated by an angled partition 206. Tank 138 further includes side or end walls 208 and 210. Partitions 202, 204 and 206 extend the entire length of the tank 138 between walls 208 and 210 with the exception of an opening 211 near the top end of partition 202 adjacent wall 208. The opening 211 allows the escape or movement of air bubbles out of compartment 100B into compartment 100A and out through a skimming trough defined between vertical walls 198 and 212. Vertical wall 212 is parallel to and connected to wall 178 by oppositely inclined surfaces or walls 214 and 216. The upper end of vertical wall 212 extends upwardly a short distance beyond angled surface 216 to form a spillway for receiving a wastewater mixture from a conduit 134. Top sections 192 and 194 include vent tubes 218 and 220 for venting gases (methane, air, etc.) from the tank 138.

Tank unit 116 also includes sludge removal apparatus in the form of a sludge dredge or drag line generally designated 222 and shown to include a plurality of blades 224 connected to an elongate chain or cable 226 and which are directed by housing sections 228 and 230 so as to follow a path having a portion which extends along the base of compartment 100A so as to provide for the removal of sludge 142 therefrom. The cable and blade assembly 224, 226 is driven in a clockwise direction (FIG. 3) by an air driven motor, rotary actuator or cylinder arrangement 232 and an axle and sprocket assembly 234.

Tank unit 116 also includes surface debris removal apparatus 238 for removing any surface debris 140 (scum, froth, floc, foam, etc.) which collects in the skimming trough. The apparatus 238 is shown to include a drag line having a plurality of rectangular blades 240 connected to one or more cables or chains 242 driven in a clockwise direction (FIG. 3) by an air driven motor, rotary actuator or cylinder arrangement 244 and a drive shaft and sprocket arrangement 246.

It is preferred to use respective air cylinder arrangements to drive the sludge and surface debris dredges or drag lines 222 and 238 to facilitate the incremental movement or indexing of the blades through short distances to allow time for moisture to drain from the debris and sludge and, thereby, minimize the moisture content of the removed sludge and surface debris. For example, using an air cylinder or rotary actuator arrangement to drive each of the sprockets 234 and 246 through successive one-quarter turn (90°) increments every 2–6 seconds, preferably every 4 seconds provides for a 50% or less moisture content in the sludge 142 and surface debris 140 which exits the tank 138. In accordance with a particular example, the preferred air cylinder arrangement includes a source of pressurized air at 40–100 psi, preferably 60 psi, a BIMBA 176-P single acting 1½ inch bore air cylinder, BIMBA Manufacturing Co., Monee, Ill., a Dayton 2-Way NC round body solenoid valve, a Dayton repeat cycle time delay relay, an about 4.24 inch long lever arm and a Torrington drawn cup roller clutch, the Torrington Co., Torrington, Conn. By having one end of the lever arm pivotally attached to the piston rod of the air cylinder and the other end of the lever arm fixedly attached to the housing of the clutch, extension of the piston rod causes a one-quarter (90°) rotation of the shaft and sprocket driving the respective drag line. The clutch slips or overruns during retraction of the piston rod. Although it is preferred to use an air cylinder arrangement to incrementally drive the drag lines, other drive means such as pulse driven air motors or electric servo motors may be used.

Near the base of compartment 100C of tank 138, end wall 208 includes a sludge port or drain 250 for removing any sludge which accumulates in the bottom of compartments 100C and 100D. Also, near the base of compartment 100C is located porous plastic tubes 252 and 254 for forming first and second air curtains 256 and 258. The air bubbles from air curtains 256 and 258 move upwardly through compartment 100C and join together near the top of the compartment to form a voluminous mass of air bubbles 260 which tends to block opening 146 between compartments 100B and 100C. Porous tubes 252 and 254 may be opposing sides of a loop of porous tubing. For example, a loop of about one quarter inch diameter tubing used in conventional aquarium apparatus for aerating fish tanks. Alternatively, tubes 252 and 254 may be rigid porous pipes which extend between end walls 208 and 210 and include openings ranging in size from 10 to 800 microns.

Although it is not shown in the drawings, it is to be understood that the tank units 116 and 120 include a plurality of ports or drains for not only draining the tanks periodically for cleaning and maintenance but also for the testing of the effluent in each of the compartments as well as for injecting pressurized air or dewatering agents or chemicals into the compartments as necessary. Further, the tank units 116 and 120 include a plurality of removable panels allowing access for maintenance and spot checking of the surface debris and sludge removal apparatus. Although it is preferred that the tanks 138 and 158 of tank units 116 and 120 be formed of a durable plastic or resin material such as reinforced fiberglass, it is contemplated that the tanks may also be formed of other rigid and durable materials such as plastic coated metal. Sensors for checking the ORP, conductivity, optical clarity, pH, temperature, etc. of the wastewater may be located in side walls 208 and 210 so as to check the condition and contaminant levels of the wastewater in one or more of the compartments 100A–100D.

With reference again to FIGS. 2 and 3 of the drawings, it is to be understood that tank unit 120 is substantially identical to tank unit 116, that tank units 116 and 120 are arranged with tank 138 located directly above tank 158 and with mixers 114 and 118 located in the triangular opening in the base of each of the respective tanks 138 and 158.

Although each of the tank units 116 and 120 include both surface debris and sludge removal means (drag lines), for the sake of clarity only the surface debris (floating contaminant) removal apparatus 238 of tank unit 116 and a sludge removal apparatus 322 of tank unit 120 are shown in FIG. 3. Thus, FIG. 3 depicts different cross-sectional views of tank units 116 and 120 so as to provide a more clear understanding of the different removal apparatus. It is to be remembered that in the particular embodiment shown in FIGS. 2 and 3 of the drawings, that tank units 116 and 120 are substantially identical, so that the detailed description of tank unit 116 combined with the description of the sludge removal apparatus 300 of tank unit 120 provides a complete disclosure of the system 100.

With particular reference to FIG. 3 of the drawings, the system 100 includes a chute 270 which guides the surface debris 140 and sludge 142 and 162 from tank units 116 and 120 into a common collection bin 272. Chute 270 is attached to a rectangular housing 274 which surrounds upper and lower tank units 116 and 120 and a rectangular frame 276 which supports tank unit 116 above tank unit 120. Housing 274 includes a vent 278 which allows for the venting of gases and odors from system 100 to the atmosphere or to a pollution control device.

Wastewater treatment system 100 includes a main pump 112 which receives raw wastewater from a conduit 126 and supplies the wastewater under pressure through a conduit 132 to the first mixing chamber or vessel 114. Mixing chamber 114 also receives pressurized air from a line 280 and an aqueous dewatering agent or chemical mixture through a line 282. An aqueous chemical mixture supply tank 284 supplies the aqueous mixture to line 282 with the amount of aqueous chemical mixture being added to mixing chamber 114 being controlled by a pump 286. The aqueous chemical mixture in tank 284 is agitated by a mechanical agitating device 288. The aqueous chemical mixture from supply tank 284 is supplied to mixing chamber 118 of tank unit 120 by line 282 and pump 286 using a Y-connector in the line following the pump 286. Alternatively, mixer 118 may have a separate supply line and pump so as to independently control the amount of chemical agents supplied to mixing chambers 114 and 118.

Note that all of the items common to the system 10 of FIG. 1 and the system 100 of FIGS. 2 and 3 have the same reference numbers as that given in FIG. 1 except that in FIGS. 2 and 3 the reference number has been increased by 100. For example, the main pump 12 of the system 10 of FIG. 1 is labeled main pump 112 in FIG. 3. Likewise, the sludge removal apparatus 322 of the second or lower tank unit 120 has the same reference numerals as that of the sludge removal apparatus 222 of tank unit 116 (FIG. 2) with the exception that the reference numerals have been increased by 100 so as to facilitate an understanding of the present invention and similarities between the items shown in FIGS. 1–3.

Tank unit 120 includes a tank 158 constructed substantially identical to tank 138 and having gas vents 318 and 320 extending from the upper surface thereof. Vent tubes 218, 220, 278, 318 and 320 may all be connected to a common blower or suction device for drawing gases from tank units 116 and 120 as well as housing 274 and chute 270.

Sludge dredge 322 includes a plurality of blades or discs 324 attached to a flexible chain or cable 326 which is guided by housings 328 and 330 so as to circumvent a path having a section which lies along the base or bottom 382 of compartment 300A so as to provide for the disposal of sludge 162 from an opening in housing 330 within chute 270. The cable and disc arrangement 324 and 326 is driven by an air driven motor or cylinder arrangement for rotating a sprocket assembly 334.

In accordance with one example of the system 100, the tank units 116 and 120 have approximate dimensions of six feet, by three feet, by three feet, mixers 114 and 118 are cylindrical plastic tanks and each hold about 29 gallons, conduit 134 has about a three inch diameter, wastewater from conduit 134 is spread out along a six foot long spillway and flows into compartment 100A; compartment 100A which holds about 60 gallons, compartment 100B holds about 170 gallons, compartment 100C holds about 36 gallons, compartment 100D holds about 25 gallons and, thus, each of the tank units 116 and 120 (including mixers 114 and 118) holds about 320 gallons. A wastewater flow rate of 75 gallons per minute through the tank units 116 and 120 of this example gives a hold time of over 8.5 minutes, while a flow rate of 37.5 gallons per minute gives a hold time of over 17 minutes.

Depending on the type and contaminant level of the wastewater being treated, contaminant removal may be enhanced by allowing the sludge (settled contaminants) 142 in the base of compartment 100A to accumulate to a height where it blocks opening 144 and causes the wastewater to flow through the sludge.

Figure 4:
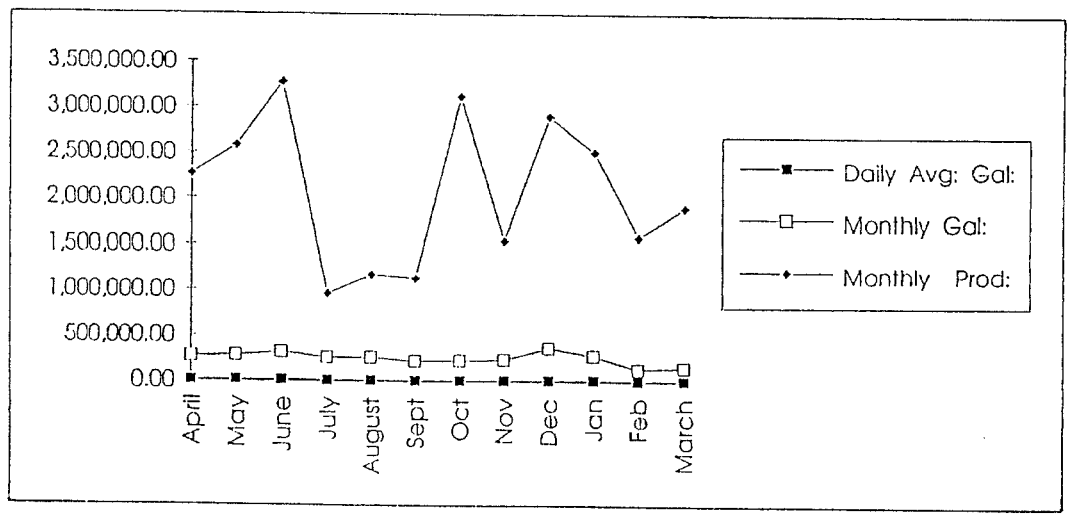
FIGS. 4 and 5 are graphical illustrations of the data given in Table I.
Figure 5:
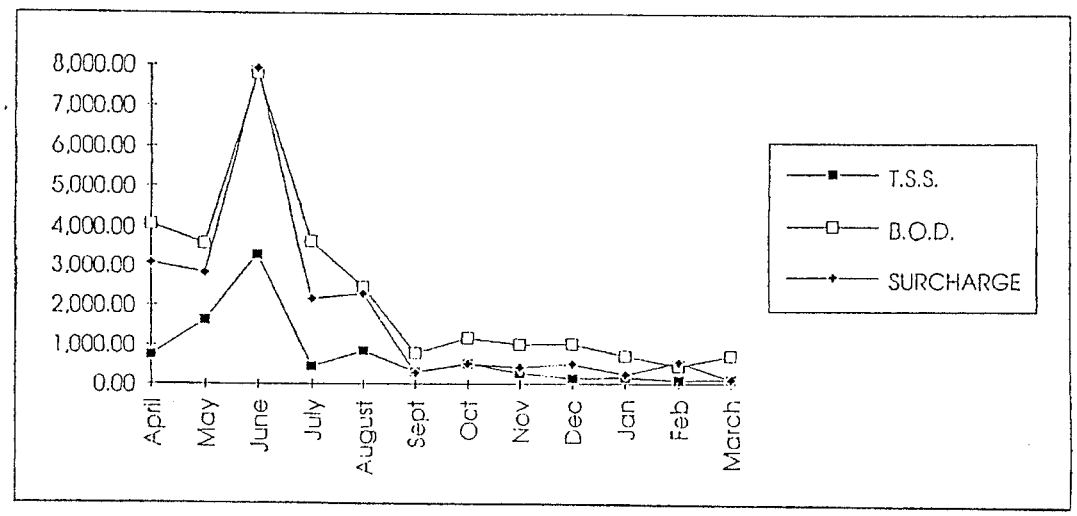

With reference to TABLE I and FIGS. 4 and 5 of the drawings, implementation of a wastewater treatment system in accordance with the present invention in September 1993 greatly reduced the TSS and BOD levels and, thereby, reduced the sewage surcharge related to the wastewater produced by a poultry meat processing facility. Consequently, the system and method of the present invention can be used to essentially eliminate sewage surcharges by substantially reducing TSS and BOD contaminant levels. In TABLE I, the DATE column runs sequentially from April 1993 to March 1994, the DAILY AVG column refers to the average number of gallons of wastewater produced by the poultry rendering process each day, the MONTHLY GAL column represents the total number of gallons of wastewater produced each month, the MONTHLY PROD column indicates the total gallons of meat product produced, the TSS and BOD columns refer to the average TSS and BOD levels (mg/l) for the wastewater produced that month, and the SURCHARGE column represents the monthly sewage surcharge in dollars. A wastewater treatment system was not used April 1993–August 1993. A single two-tank treatment system in accordance with the present invention was used in September 1993–March 1994.

In accordance with another embodiment of the present invention, the system is fully automated in that the drive to the main wastewater pump, pumps supplying dewatering agents or chemicals to the mixers, and motors or actuators for the surface debris and sludge removal apparatus are all controlled by a central processing unit which receives input from a system operator, wastewater condition sensors, flow sensors and supply sensors and provides control signals to fluid flow control valves and pressurized air control valves associated with the pressurized air source for each pump, actuator and motor. For example, a HANNA Instruments HI8931 panel mounted conductivity controller, HI8711 or WM8910 pH controller, WM8923 pH and conductivity controller, or WM8930 conductivity controller can be used with Warren Rupp 4–20 milli amp input variable speed pump control (air valve) to control the flow of chemicals to mixers 14 and 18 or 114 and 118.

Thus, it will be appreciated that as a result of the present invention, a highly effective wastewater treatment system and method is provided by which the principal objective, among others, is completely fulfilled. It is contemplated and will be apparent to those skilled in the art from the preceding description and the accompanying drawings, that modifications and/or changes may be made in the illustrated embodiments without departure from the present invention. For example, dredging means may be added to the base of compartments 1C and 1D or 100C and 100D for the intermittent or continuous removal of sludge therefrom. Accordingly, it is expressly intended that the foregoing description and accompanying drawings are illustrative of preferred embodiments only, not limiting, and that the true spirit and scope of the present invention will be determined by reference to the appended claims.

chemical and pressurized air, and providing for mixing of the treated water, air and at least one treatment chemical by agitation thereof by the pressurized air to form a second aerated mixture, said second aerated mixture being supplied to said second tank unit, wherein each of said first and second tank units further includes a wastewater inlet compartment with said first tank unit having a first aerated mixture feed means for feeding the first aerated mixture at the top of the inlet compartment in the area of said skimming means where said floating contaminants are collected and removed and said second tank unit having a wastewater inlet compartment with a second aerated mixture feed means for feeding the second aerated mixture at the top of the inlet compartment in the area of said skimming means where said floating contaminants are collected and removed;

pumping means for supplying raw wastewater under pressure to said first mixing chamber;

treatment chemical supply means for supplying said at least one treatment chemical to at least each of said first and second mixing chambers; and, a source of pressurized air for supplying pressurized air to at least each of said air curtain means of said first and

TABLE I

| DATE | Daily Avg: Gal: | Monthly Gal: | Monthyl Prod: | DATE | T.S.S. | B.O.D. | SURCHARGE |
|---|---|---|---|---|---|---|---|
| April | 11,183.00 | 268,400.00 | 2,266,155.00 | April | 750.00 | 4,065.00 | $3,072.61 |
| May | 14,045.00 | 280,900.00 | 2,582,050.00 | May | 1,630.00 | 3,580.00 | $2,814.44 |
| June | 13,145.00 | 315,500.00 | 3,281,350.00 | June | 3,292.50 | 7,810.00 | $7,925.60 |
| July | 12,266.00 | 257,600.00 | 954,850.00 | July | 450.00 | 3,645.00 | $2,161.23 |
| August | 12,357.00 | 259,500.00 | 1,159,100.00 | August | 845.00 | 2,460.00 | $2,304.57 |
| Sept | 9,955.00 | 219,000.00 | 1,124,100.00 | Sept | 312.00 | 795.50 | $291.01 |
| Oct | 10,327.00 | 227,200.00 | 3,121,630.00 | Oct | 516.00 | 1,169.00 | $519.12 |
| Nov | 12,600.00 | 239,400.00 | 1,539,350.00 | Nov | 273.50 | 1,016.00 | $430.18 |
| Dec | 16,631.00 | 365,900.50 | 2,907,108.00 | Dec | 133.50 | 1,027.00 | $499.73 |
| Jan | 14,100.00 | 282,000.00 | 2,507,292.00 | Jan | 163.50 | 712.50 | $225.67 |
| Feb | 6,030.00 | 136,600.00 | 1,575,200.00 | Feb | 87.70 | 454.37 | $542.07 |
| March | 6,650.00 | 153,200.00 | 1,891,315.00 | March | 94.00 | 705.00 | $90.33 |

I claim:

1. An apparatus for removing contaminants from raw wastewater, such as the wastewater from a meat rendering process wherein the raw wastewater contains contaminants including solids, sludge, meat, bone, fat, blood and the like, comprising:

first and second tank units, wherein each of said tank units includes a tank, skimming means for removing floating contaminants from at least a portion of the surface of the wastewater, dredging means for removing settled contaminants from at least a portion of the bottom of the tank, a plurality of partitions and openings inside the tank for directing the flow and changing the velocity of the wastewater as it flows through the tank, and air curtain means located near the bottom of the tank for forming a curtain of air bubbles in the wastewater in at least a portion of the tank;

first and second mixing chambers, said first mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said first tank unit, said second mixing chamber receiving a first treated water output of said first tank unit, at least one treatment second tank units and to said first and second mixing chambers for agitating and aerating the contents thereof;

whereby raw wastewater containing contaminants is pumped to said first mixing chamber, mixed with air and the at least one treatment chemical to form the first aerated mixture which flows through said first tank unit where a substantial portion of the contaminants are removed via settling and flotation facilitated by the at least one treatment chemical and air curtain to form the first treated water output which flows to said second mixing chamber where it is mixed with air and the at least one treatment chemical to form the second aerated mixture which flows through said second tank unit where a substantial portion of the remaining contaminants are removed by flotation and settling facilitated by said at least one treatment chemical and air curtain to form a second treated water output which can be recycled or disposed of in a municipal sewer.

2. The apparatus as recited in claim 1 wherein said pumping means, each of said skimming means and each of said dredging means is air driven and said source of pressurized air supplies pressurized air thereto.

3. The apparatus as recited in claim 2 wherein said treatment chemical supply means includes storage means for storing said at least one treatment chemical in an aqueous mixture and air driven pump means for pumping said aqueous mixture to each of said mixing chambers.

4. The apparatus as recited in claim 3, wherein said apparatus comprises a vented system having a limited number of inputs and outputs with the inputs consisting essentially of the raw wastewater, pressurized air, fresh air and the aqueous treatment chemical mixture, and with the outputs consisting essentially of the second treated water output, vent gases released from said first and second tank units, floating contaminants removed from the surface of said first and second tank units, and settled contaminants removed from the bottom of said first and second tank units.

5. The apparatus as recited in claim 1 further comprising microorganism supply means for supplying to each of said first and second tank units microorganisms which facilitate the removal of contaminants from the wastewater.

6. The apparatus as recited in claim 1 wherein said treatment chemical supply means supplies at least one treatment chemical selected from the group consisting of surfactants, dewatering agents and flocculating agents.

7. The apparatus as recited in claim 1 wherein said treatment chemical supply means supplies at least one treatment chemical a cationic polymer.

8. The apparatus as recited in claim 7 wherein said cationic polymer is a high molecular weight polyacrylamide copolymer.

9. An apparatus for removing contaminants from raw wastewater, such as the wastewater from a meat rendering process wherein the raw wastewater contains contaminants including solids, sludge, meat, bone, fat, blood and the like, comprising:

first and second tank units, wherein each of said tank units includes a tank, skimming means for removing floating contaminants from at least a portion of the surface of the wastewater, dredging means for removing settled contaminants from at least a portion of the bottom of the tank, a plurality of partitions and openings inside the tank for directing the flow and changing the velocity of the wastewater as it flows through the tank, and air curtain means located near the bottom of the tank for forming a curtain of air bubbles in the wastewater in at least a portion of the tank;

first and second mixing chambers, said first mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said first tank unit, said second mixing chamber receiving a first treated water output of said first tank unit, at least one treatment chemical and pressurized air, and providing for mixing of the treated water, air and at least one treatment chemical by agitation thereof by the pressurized air to form a second aerated mixture, said second aerated mixture being supplied to said second tank unit;

pumping means for supplying raw wastewater under pressure to said first mixing chamber wherein said pumping means comprises an air driven diaphragm pump;

treatment chemical supply means for supplying said at least one treatment chemical to at least each of said first and second mixing chambers; and, a source of pressurized air for supplying pressurized air to said air curtain means of said first and second tank units and to said first and second mixing chambers for agitating and aerating the contents thereof;

whereby raw wastewater containing contaminants is pumped to said first mixing chamber, mixed with air and the at least one treatment chemical to form the first aerated mixture which flows through said first tank unit where a substantial portion of the contaminants are removed via settling and flotation facilitated by the at least one treatment chemical and air curtain to form the first treated water output which flows to said second mixing chamber where it is mixed with air and the at least one treatment chemical to form the second aerated mixture which flows through said second tank unit where a substantial portion of the remaining contaminants are removed by flotation and settling facilitated by said at least one treatment chemical and air curtain to form a second treated water output which can be recycled or disposed of in a municipal sewer.

10. An apparatus for removing contaminants from raw wastewater, such as the wastewater from a meat rendering process wherein the raw wastewater contains contaminants including solids, sludge, meat, bone, fat, blood and the like, comprising:

first and second tank units, wherein each of said tank units includes a tank, skimming means for removing floating contaminants from at least a portion of the surface of the wastewater, dredging means for removing settled contaminants from at least a portion of the bottom of the tank, wherein said skimming means and said dredging means comprises an air driven drag line, a plurality of partitions and openings inside the tank for directing the flow and changing the velocity of the wastewater as it flows through the tank, and air curtain means located near the bottom of the tank for forming a curtain of air bubbles in the wastewater in at least a portion of the tank;

first and second mixing chambers, said first mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said first tank unit, said second mixing chamber receiving a first treated water output of said first tank unit, at least one treatment chemical and pressurized air, and providing for mixing of the treated water, air and at least one treatment chemical by agitation thereof by the pressurized air to form a second aerated mixture, said second aerated mixture being supplied to said second tank unit, pumping means for supplying raw wastewater under pressure to said first mixing chamber;

treatment chemical supply means for supplying said at least one treatment chemical to at least each of said first and second mixing chambers; and, a source of pressurized air for supplying pressurized air to said air curtain means of said first and second tank units and to said first and second mixing chambers for agitating and aerating the contents thereof;

whereby raw wastewater containing contaminants is pumped to said first mixing chamber, mixed with air and the at least one treatment chemical to form the first aerated mixture which flows through said first tank unit where a substantial portion of the contaminants are removed via settling and flotation facilitated by the at least one treatment chemical and air curtain to form the first treated water output which flows to said second mixing chamber where it is mixed with air and the at least one treatment chemical to form the second aerated mixture which flows through said second tank unit where a substantial portion of the remaining contaminants are removed by flotation and settling facilitated by said at least one treatment chemical and air curtain to form a second treated water output which can be recycled or disposed of in a municipal sewer.

11. The apparatus as recited in claim 1 wherein said first and second tank units are vertically stacked in a superimposed relationship with the first tank unit located above the second tank unit, with said first treated water output of said first tank unit flowing by gravity from said first tank unit to said second mixing chamber and on to said second tank unit, and wherein said skimming means and dredging means of each of said tank units empties out at the same side of each said tank units so that said skimmed floating contaminants and dredged settled contaminants exit the tank units and are deposited into a common froth and sludge receiving element for temporary storage thereof adjacent said apparatus.

12. The apparatus as recited in claim 11 wherein said first and second mixing chambers are located in respective openings in the base of each of said first and second tank units and wherein said wastewater pumping means and said treatment chemical supply means are located adjacent said second tank unit so as to provide for an overall compactness to said apparatus.

13. The apparatus as recited in claim 12 wherein said first and second tank units are surrounded by a substantially rectangular housing including a vent for venting gases from said first and second tank units.

14. The apparatus as recited in claim 1 wherein said first and second tank units are formed of molded fiberglass.

15. The apparatus as recited in claim 1 wherein each of said tanks of said first and second tank units have a substantially rectangular outer configuration and include a triangular opening in the base thereof.

16. The apparatus as recited in claim 15 wherein said partitions and openings of said tanks of said first and second tank units define a plurality of sequential treatment compartments within each tank.

17. The apparatus as recited in claim 1 wherein said first and second mixing chambers are cylindrical plastic vessels.

18. The apparatus as recited in claim 1 wherein said first and second mixing chambers are integral with said tanks and are part of said first and second tank units.

19. The apparatus as recited in claim 1 wherein said air curtain means include plastic materials which cause the air bubbles produced by said air curtains to be positively charged to facilitate contaminant removal.

20. The apparatus as recited in claim 1 further including means for checking the contamination levels of said wastewater and controlling the amount of said at least one treatment chemical added to said first and second mixing chambers.

21. An apparatus for removing contaminants from raw wastewater, such as the wastewater from a meat rendering process wherein the raw wastewater contains contaminants including solids, sludge, meat, bone, fat, blood and the like, comprising:

at least one tank unit, wherein said tank unit includes a tank, skimming means for removing floating contaminants from at least a portion of the surface of the wastewater, dredging means for removing settled contaminants from at least a portion of the bottom of the tank, a plurality of partitions and openings inside the tank for directing the flow and changing the velocity of the wastewater as it flows through the tank, and air curtain means located near the bottom of the tank for forming a curtain of air bubbles in the wastewater in at least a portion of the tank;

at least one mixing chamber, said mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said at least one tank unit, wherein said tank unit further includes a wastewater inlet compartment with a first aerated mixture feed means for feeding the first aerated mixture at the top of the inlet compartment in the area of said skimming means where said floating contaminants are collected and removed;

pumping means for supplying raw wastewater under pressure to said mixing chamber;

treatment chemical supply means for supplying said at least one treatment chemical to said at least one mixing chamber; and, a source of pressurized air for supplying pressurized air to said at least one air curtain means and to said at least one mixing chamber for agitating and aerating the contents thereof;

whereby raw wastewater containing contaminants is pumped to said mixing chamber, mixed with air and the at least one treatment chemical to form the first aerated mixture which flows through said tank unit where a substantial portion of the contaminants are removed via settling and flotation facilitated by the at least one treatment chemical and air curtain to form a treated water output.

22. The apparatus as recited in claim 1 wherein said skimming means and said dredging means produce removed contaminants having a maximum moisture content of 50 percent.

23. An apparatus for removing contaminants from raw wastewater, such as the wastewater from a meat rendering process wherein the raw wastewater contains contaminants including solids, sludge, meat, bone, fat, blood and the like, comprising:

first and second tank units, wherein each of said tank units includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing wastewater compartment for forming a curtain of air bubbles which moves opposite to the downwardly flowing wastewater in the downwardly flowing wastewater compartment;

whereby raw wastewater containing contaminants is pumped to and flows through said first tank unit where a substantial portion of the contaminants are removed via settling and floatation facilitated by the air curtain to form a first treated water output which flows to and flows through said second tank unit where a substantial portion of the remaining contaminants are removed by flotation and settling facilitated by the air curtain to form a second treated water output which can be recycled or disposed of in a municipal sewer.

24. The apparatus as recited in claim 23, wherein said apparatus comprises a vented system having a limited number of inputs and outputs with the inputs including the raw wastewater, pressurized air, and fresh air and with the outputs including the second treated water output, vent gases released from said first and second tank units, floating contaminants removed from the surface of said first and second tank units, and settled contaminants removed from the bottom of said first and second tank units.

25. The apparatus as recited in claim 23 further including microorganism supply means for supplying to each of said first and second tank units microorganisms which facilitate the removal of contaminants from the wastewater.

26. The apparatus as recited in claim 23 wherein said first and second tank units are vertically stacked in a superimposed relationship with the first tank unit located above the second tank unit, with said first treated water output of said first tank unit flowing by gravity from said first tank unit to said second tank unit, and wherein said skimming means and dredging means of each of said tank units empties out at the same side of each said tank units so that said skimmed floating contaminants and dredged settled contaminants exit the tank units and are deposited into a common froth and sludge receiving element for temporary storage thereof adjacent said apparatus.

27. An apparatus for removing contaminants from raw wastewater, such as the wastewater from a meat rendering process wherein the raw wastewater contains contaminants including solids, sludge, meat, bone, fat, blood and the like, comprising:

at least one tank unit, wherein said tank unit includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing wastewater compartment for forming a curtain of air bubbles which moves opposite to the downwardly flowing wastewater in the downwardly flowing wastewater compartment;

whereby raw wastewater containing contaminants flow through said tank unit where a substantial portion of the contaminants are removed via settling and floatation facilitated by the air curtain to form a treated water output.

28. An apparatus for removing contaminants from raw wastewater, such as the wastewater from a meat rendering process wherein the raw wastewater contains contaminants including solids, sludge, meat, bone, fat, blood and the like, comprising:

first and second tank units, wherein each of said tank units includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing compartment wastewater for forming a curtain of air bubbles which moves opposite to the downwardly flowing wastewater in the downwardly flowing wastewater compartment;

first and second mixing chambers, said first mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said first tank unit, said second mixing chamber receiving a first treated water output of said first tank unit, at least one treatment chemical and pressurized air, and providing for mixing of the treated water, air and at least one treatment chemical by agitation thereof by the pressurized air to form a second aerated mixture, said second aerated mixture being supplied to said second tank unit;

pumping means for supplying raw wastewater under pressure to said first mixing chamber;

treatment chemical supply means for supplying said at least one treatment chemical to at least each of said first and second mixing chambers; and, a source of pressurized air for supplying pressurized air to each of said air curtain means of said first and second tank units and to said first and second mixing chambers for agitating and aerating the contents thereof;

whereby raw wastewater containing contaminants is pumped to said first mixing chamber, mixed with air and the at least one treatment chemical to form the first aerated mixture which flows through said first tank unit where a substantial portion of the contaminants are removed via settling and flotation facilitated by the at least one treatment chemical and air curtain to form the first treated water output which flows to said second mixing chamber where it is mixed with air and the at least one treatment chemical to form the second aerated mixture which flows through said second tank unit where a substantial portion of the remaining contaminants are removed by flotation and settling facilitated by said at least one treatment chemical and air curtain to form a second treated water output which can be recycled or disposed of in a municipal sewer.

29. The apparatus as recited in claim 28, wherein said apparatus comprises a vented system having a limited number of inputs and outputs with the inputs including the raw wastewater, pressurized air, fresh air and the aqueous treatment chemical mixture, and with the outputs including the second treated water output, vent gases released from said first and second tank units, floating contaminants removed from the surface of said first and second tank units, and settled contaminants removed from the bottom of said first and second tank units.

30. The apparatus as recited in claim 28 further including microorganism supply means for supplying to each of said first and second tank units microorganisms which facilitate the removal of contaminants from the wastewater.

31. An apparatus for removing contaminants from raw wastewater, such as the wastewater from a meat rendering process wherein the raw wastewater contains contaminants including solids, sludge, meat, bone, fat, blood and the like, comprising:

at least one tank unit, wherein said tank unit includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing compartment wastewater for forming a curtain of air bubbles which moves opposite to the downwardly flowing wastewater in the downwardly flowing wastewater compartment;

at least one mixing chamber, said mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said at least one tank unit;

pumping means for supplying raw wastewater under pressure to said at least one mixing chamber;

treatment chemical supply means for supplying said at least one treatment chemical to said at least one mixing chamber;

a source of pressurized air for supplying pressurized air to said air curtain means and to said at least one mixing chamber for agitating and aerating the contents thereof;

control means for controlling the pumping means, treatment chemical supply means, and pressurized air supply;

whereby raw wastewater containing contaminants is pumped to said mixing chamber, mixed with air and the at least one treatment chemical to form the first aerated mixture which flows through said tank unit where a substantial portion of the contaminants are removed via settling and flotation facilitated by the at least one treatment chemical and air curtain to form a treated water output.

32. An apparatus for removing contaminants from raw wastewater consisting essentially of:

first and second tank units, wherein each of said tank units includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing compartment wastewater for forming a curtain of air bubbles which moves opposite to the downwardly flowing wastewater in the downwardly flowing wastewater compartment;

first and second mixing chambers, said first mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said first tank unit, said second mixing chamber receiving a first treated water output of said first tank unit, at least one treatment chemical and pressurized air, and providing for mixing of the treated water, air and at least one treatment chemical by agitation thereof by the pressurized air to form a second aerated mixture, said second aerated mixture being supplied to said second tank unit;

pumping means for supplying raw wastewater under pressure to said first mixing chamber;

treatment chemical supply means for supplying said at least one treatment chemical to at least each of said first and second mixing chambers;

a source of pressurized air for supplying pressurized air to said pumping means, each of said air curtain means of said first and second tank units and to said first and second mixing chambers for agitating and aerating the contents thereof; and control means for controlling the pumping means, skimming and dredging means, treatment chemical supply means, and air curtain means;

whereby raw wastewater containing contaminants is pumped to said first mixing chamber, mixed with air and the at least one treatment chemical to form the first aerated mixture which flows through said first tank unit where a substantial portion of the contaminants are removed via settling and flotation facilitated by the at least one treatment chemical and air curtain to form the first treated water output which flows to said second mixing chamber where it is mixed with air and the at least one treatment chemical to form the second aerated mixture which flows through said second tank unit where a substantial portion of the remaining contaminants are removed by flotation and settling facilitated by said at least one treatment chemical and air curtain to form a second treated water output which can be recycled or disposed of in a municipal sewer.

33. An apparatus for removing contaminants from raw wastewater consisting essentially of:

at least one tank unit, wherein said tank unit includes a tank, skimming means for removing floating contaminants from at least a portion of the surface of the wastewater, dredging means for removing settled contaminants from at least a portion of the bottom of the tank, a plurality of partitions and openings in the tank for directing the flow and changing the velocity of the wastewater as it flows through the tank, said plurality of partitions defining a wastewater inlet compartment with raw wastewater feed means for feeding the raw wastewater at the top of the wastewater inlet compartment and an opening at the bottom of the wastewater inlet compartment for allowing the raw wastewater fed into the wastewater inlet compartment to flow downwardly and through the wastewater inlet compartment and through said opening, said wastewater inlet compartment including a bottom wall portion defining a collection area for settled contaminants with said dredging means communicating with said bottom wall portion for removing said settled contaminants, said plurality of partitions further including means comprising two generally upright partitions defining a downwardly flowing wastewater compartment within the tank with an inlet opening at the top of the downwardly flowing wastewater compartment and an outlet at the bottom of the downwardly flowing wastewater compartment, air curtain means located near the bottom of the downwardly flowing compartment wastewater for forming a curtain of air bubbles which moves opposite to the downwardly flowing wastewater in the downwardly flowing wastewater compartment;

at least one mixing chamber, said mixing chamber receiving raw wastewater, at least one treatment chemical and pressurized air, and providing for mixing of the raw wastewater with the at least one treatment chemical and air by agitation thereof by the pressurized air to form a first aerated mixture, said first aerated mixture being supplied to said at least one tank unit;

pumping means for supplying raw wastewater under pressure to said at least one mixing chamber;

treatment chemical supply means for supplying said at least one treatment chemical to said at least one mixing chamber; and a source of pressurized air for supplying pressurized air to said pumping means, said air curtain means, and to said at least one mixing chamber for agitating and aerating the contents thereof; and whereby raw wastewater containing contaminants is pumped to said mixing chamber, mixed with air and the at least one treatment chemical to form the first aerated mixture which flows through said tank unit where a substantial portion of the contaminants are removed via settling and flotation facilitated by the at least one treatment chemical and air curtain to form a treated water output.

34. The apparatus as recited in claim 2 wherein the exhaust air from said pumping means, skimming means, and dredging means is used as the source of pressurized air for said mixing chambers.

35. The apparatus as recited in claim 11 wherein said apparatus has a square foot of floor space for the tank units to number of gallons of wastewater treated per hour ratio of about 18 square feet/4500 gallons per hour.

* * * * *